United States Patent
Hunt et al.

(10) Patent No.: US 9,263,224 B2
(45) Date of Patent: Feb. 16, 2016

(54) LIQUID BEARING ASSEMBLY AND METHOD OF CONSTRUCTING SAME

(71) Applicant: General Electric Company, Schenectady, NY (US)

(72) Inventors: Ian Strider Hunt, Sussex, WI (US); Ben David Poquette, Wauwatosa, WI (US); Andrew Thomas Triscari, Hubertus, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 294 days.

(21) Appl. No.: 13/906,944

(22) Filed: May 31, 2013

(65) Prior Publication Data

US 2014/0355743 A1    Dec. 4, 2014

(51) Int. Cl.
| | |
|---|---|
| *H01J 35/10* | (2006.01) |
| *F16C 33/04* | (2006.01) |
| *F16C 33/12* | (2006.01) |
| *F16C 32/06* | (2006.01) |
| *F16C 17/10* | (2006.01) |
| *F16C 33/10* | (2006.01) |

(52) U.S. Cl.
CPC ............ *H01J 35/101* (2013.01); *F16C 33/043* (2013.01); *F16C 33/122* (2013.01); *F16C 17/107* (2013.01); *F16C 33/107* (2013.01); *F16C 2202/66* (2013.01); *F16C 2210/08* (2013.01); *F16C 2223/30* (2013.01); *F16C 2380/16* (2013.01); *H01J 35/106* (2013.01); *H01J 2235/106* (2013.01); *H01J 2235/1066* (2013.01); *H01J 2235/1086* (2013.01); *Y10T 29/49639* (2015.01)

(58) Field of Classification Search
CPC ............ F16C 2202/66; F16C 2223/30; F16C 2380/16; F16C 32/0633; F16C 33/04; F16C 33/043; F16C 33/12; H01J 2235/1046; H01J 35/101; H01J 35/106; H01J 2235/106; H01J 2235/1066; H01J 2235/1086; H01J 2235/1208; H01J 35/10; H01J 2235/08; H01J 2235/1291; H01J 35/105; Y10T 29/49639
USPC ................. 378/132, 133; 384/107, 112, 625; 29/898.02

See application file for complete search history.

(56) References Cited

U.S. PATENT DOCUMENTS

| | | | | |
|---|---|---|---|---|
| 4,614,445 A | * | 9/1986 | Gerkema et al. | ............... 384/368 |
| 4,641,332 A | * | 2/1987 | Gerkema | ....................... 378/125 |
| 5,181,235 A | | 1/1993 | Ono et al. | |

(Continued)

FOREIGN PATENT DOCUMENTS

WO    03083318 A1    10/2003

OTHER PUBLICATIONS

Zhang et al., "Hydrophobicity at a Janus Interface," Science, vol. 295, Jan. 25, 2002, pp. 663-666.

(Continued)

*Primary Examiner* — Irakli Kiknadze (57) ABSTRACT

A bearing assembly is disclosed that includes a sleeve having an opening formed therein and a shaft positioned within the opening of the sleeve such that a gap is formed between an inner surface of the sleeve and an outer surface of the shaft. A lubricant is disposed in the gap and a plurality of grooves are formed on at least one of the outer surface of the shaft and the inner surface of the sleeve. An anti-wetting coating is disposed on the at least one of the outer surface of the shaft and the inner surface of the sleeve between adjacent grooves of the plurality of grooves.

28 Claims, 9 Drawing Sheets

(56) References Cited

U.S. PATENT DOCUMENTS

| | | | |
|---|---|---|---|
| 5,204,890 A | 4/1993 | Anno et al. | |
| 5,624,191 A | 4/1997 | Fuchs et al. | |
| 5,875,227 A * | 2/1999 | Bhatt | H01J 35/101 378/132 |
| 6,160,868 A * | 12/2000 | Snyder | H01J 35/105 378/127 |
| 6,267,869 B1 | 7/2001 | MacLeod et al. | |
| 6,377,658 B1 * | 4/2002 | Vermilyea et al. | 378/131 |
| 6,726,993 B2 | 4/2004 | Teer et al. | |
| 7,933,382 B2 | 4/2011 | Hunt et al. | |
| 8,011,880 B2 | 9/2011 | Blumenthal et al. | |
| 2004/0213379 A1 * | 10/2004 | Bittl | H01J 35/10 378/132 |
| 2012/0106712 A1 * | 5/2012 | Hunt et al. | 378/132 |

OTHER PUBLICATIONS

Honig, "Validation of the No Slip Boundary Condition at Solid-Liquid Interfaces," Thesis, University of Melbourne, Oct. 2008, Cover Page and pp. 1-141.

Spikes, "Slip at the wall—evidence and tribological implications," Tribological Research and Design for Engineering Systems, 2003, pp. 525-535.

Li et al., "The partially wetted bearing—extended Reynolds equation," Tribology International, vol. 39, 2006, pp. 1428-1435.

* cited by examiner

LIQUID BEARING ASSEMBLY AND METHOD OF CONSTRUCTING SAME

BACKGROUND OF THE INVENTION

Embodiments of the invention relate generally to x-ray tubes and, more particularly, to a liquid bearing assembly useable therewith and a method of bearing construction.

X-ray systems typically include an x-ray tube, a detector, and a support structure for the x-ray tube and the detector. In operation, an imaging table, on which an object is positioned, is located between the x-ray tube and the detector. The x-ray tube typically emits radiation, such as x-rays, toward the object. The radiation typically passes through the object on the imaging table and impinges on the detector. As radiation passes through the object, internal structures of the object cause spatial variances in the radiation received at the detector. The detector then emits data received, and the system translates the radiation variances into an image, which may be used to evaluate the internal structure of the object. One skilled in the art will recognize that the object may include, but is not limited to, a patient in a medical imaging procedure and an inanimate object as in, for instance, a package in an x-ray scanner or computed tomography (CT) package scanner.

X-ray tubes include a cathode and an anode located within a high-vacuum environment. The anode structure is typically supported by ball bearings and is rotated for the purpose of distributing the heat generated at a focal spot. Typically, an induction motor is employed to rotate the anode, the induction motor having a cylindrical rotor built into a cantilevered axle that supports a disc-shaped anode target and an iron stator structure with copper windings that surrounds an elongated neck of the x-ray tube. The rotor of the rotating anode assembly is driven by the stator. An x-ray tube cathode provides a focused electron beam that is accelerated across an anode-to-cathode vacuum gap and produces x-rays upon impact with the anode. Because of the high temperatures generated when the electron beam strikes the target, it is necessary to rotate the anode assembly at high rotational speed, which places stringent demands on the ball bearings.

A liquid lubricated or liquid metal bearing may be employed in lieu of ball bearings. Advantages of liquid metal bearings include a high load capability and a high heat transfer capability due to an increased amount of contact area as compared to a ball bearing. Advantages also include low acoustic noise operation as is commonly understood in the art. Gallium, indium, or tin alloys are typically used as the liquid metal, as they tend to be liquid at room temperature and have adequately low vapor pressure at operating temperatures to meet the rigorous high vacuum requirements of an x-ray tube.

Liquid metals tend to be highly reactive and corrosive. Thus, a base metal that is resistant to such corrosion is desirable for the bearing components. As such, a refractory metal such as molybdenum or tungsten is typically used as the base material for a liquid metal bearing. Not only are such materials resistant to corrosion, but they tend to be vacuum-compatible and thus lend themselves to an x-ray tube application. However, one concern that may be encountered in the use of a liquid metal is ensuring adequate wettability of bearing surfaces with the liquid metal. When adequate wettability does not occur, the liquid metal does not completely fill or lubricate the bearing and the liquid metal bearing may run out of liquid metal during use, thus shortening the life of the x-ray tube.

Liquid lubricated bearings are also highly sensitive to take-off and landing events, which result in galling and wear on the bearing components and often constitute the failure mode of the bearing. To improve wear resistance and bearing performance a wear-resistant layer may be may be applied either to the moving or stationary surfaces of the bearing. The wear-resistant layers may, or may not, have poor wettability. If either the stationary or rotating surface is anti-wetting, then the bearing is considered "half-wetted". In these "half-wetted" bearings, the lubricant and the solid surfaces of the rotating and stationary components of bearing assembly are selected so the lubricant wets the surface of one of the bearing components, thus forming a no-slip boundary with the surface of one bearing component, and does not wet the opposing surface and thus can slip against the surface of other bearing component.

While a "half-wetted" bearing design may mitigate galling and wear between bearing components, "half-wetted" bearings experience reduced load capability and lubricant containment issues due to the interaction between the wetted and non-wetted surfaces of the bearing components.

Accordingly, it would be advantageous to have an apparatus and method that improves lubricant containment, mitigates galling, and improves wear resistance of liquid lubricated bearings. It would further be desirable to reduce net costs associated with fabricating a liquid lubricated bearing.

BRIEF DESCRIPTION OF THE INVENTION

In accordance with one aspect of the invention, a bearing includes a sleeve having an opening formed therein and a shaft positioned within the opening of the sleeve such that a gap is formed between an inner surface of the sleeve and an outer surface of the shaft. A lubricant is disposed in the gap and a plurality of grooves are formed on at least one of the outer surface of the shaft and the inner surface of the sleeve. An anti-wetting coating is disposed on the at least one of the outer surface of the shaft and the inner surface of the sleeve between adjacent grooves of the plurality of grooves.

In accordance with another aspect of the invention, a method of manufacturing a bearing includes the steps of providing a bearing assembly that includes a shaft and a sleeve having an inner diameter greater than an outer diameter of the shaft, wherein a gap is formed between an inner surface of the bearing sleeve and an outer surface of the shaft. The method also includes forming an anti-wetting coating on at least one of the outer surface of the shaft and the inner surface of the sleeve and forming a plurality of grooves on at least one of the outer surface of the shaft and the inner surface of the sleeve, wherein the plurality of grooves are absent the anti-wetting coating, and wherein the plurality of grooves and the anti-wetting coating are formed on a common surface of the bearing assembly. The method further includes disposing a lubricant in the gap.

In accordance with yet another aspect of the invention, an x-ray tube includes a cathode and a target assembly positioned to receive electrons emitted from the cathode. The target assembly includes a target and a self-lubricating bearing configured to support the target. The self-lubricating bearing includes a rotatable component having a first surface, a stationary component positioned with respect to the rotatable component such that a gap is formed between a first surface of the rotatable component and a first surface of the stationary component, and a liquid lubricant disposed within the gap. A bearing surface of the self-lubricating bearing comprises an anti-wetting surface and a non-bearing surface of the self-lubricating bearing comprises a wetting surface. The anti-wetting surface and the wetting surface are alternately located on a common surface of the self-lubricating bearing.

In accordance with yet another aspect of the invention, a bearing includes at least one friction-reducing surface comprising a plurality of alternating anti-wetting and wetting portions.

Various other features and advantages will be made apparent from the following detailed description and the drawings.

BRIEF DESCRIPTION OF THE DRAWINGS

The drawings illustrate embodiments presently contemplated for carrying out embodiments of the invention.

In the drawings.

DETAILED DESCRIPTION

Figure 1:
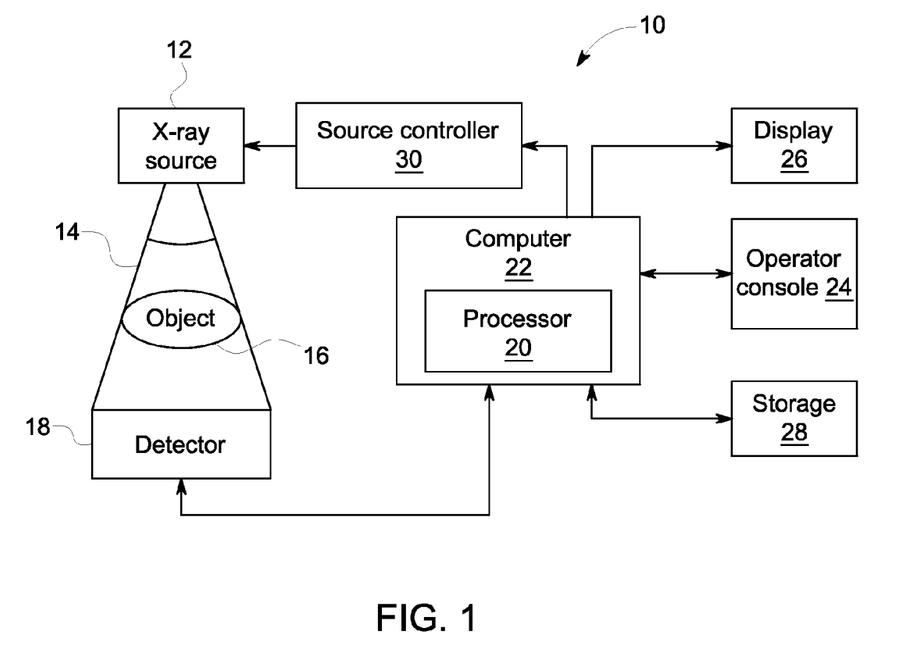
FIG. 1 is a block diagram of an imaging system incorporating embodiments of the invention.

FIG. 1 is a block diagram of an embodiment of an imaging system 10 designed both to acquire original image data and to process the image data for display and/or analysis in accordance with embodiments of the invention. It will be appreciated by those skilled in the art that various embodiments of the invention are applicable to numerous medical imaging systems implementing an x-ray tube, such as x-ray or mammography systems. Other imaging systems such as computed tomography (CT) systems and digital radiography (RAD) systems, which acquire image three dimensional data for a volume, also benefit from the invention. The following discussion of x-ray system 10 is merely an example of one such implementation and is not intended to be limiting in terms of modality.

As shown in FIG. 1, imaging system 10 includes an x-ray tube or source 12 configured to project a beam of x-rays 14 through an object 16. Object 16 may include a human subject, pieces of baggage, or other objects desired to be scanned. X-ray source 12 may be conventional x-ray tubes producing x-rays having a spectrum of energies that range, typically, from 30 keV to 200 keV. The x-rays 14 pass through object 16 and, after being attenuated, impinge upon a detector assembly 18. Each detector module in detector assembly 18 produces an analog electrical signal that represents the intensity of an impinging x-ray beam, and hence the attenuated beam, as it passes through the object 16. In one embodiment, detector assembly 18 is a scintillation based detector assembly, however, it is also envisioned that direct-conversion type detectors (e.g., CZT detectors, etc.) may also be implemented.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the x-ray system 10 and view the reconstructed image or other data from computer 22 on a display unit 26. Additionally, console 24 allows an operator to store the generated image in a storage device 28 which may include hard drives, floppy discs, compact discs, etc. The operator may also use console 24 to provide commands and instructions to computer 22 for controlling a source controller 30 that provides power and timing signals to x-ray source 12.

Figure 2:
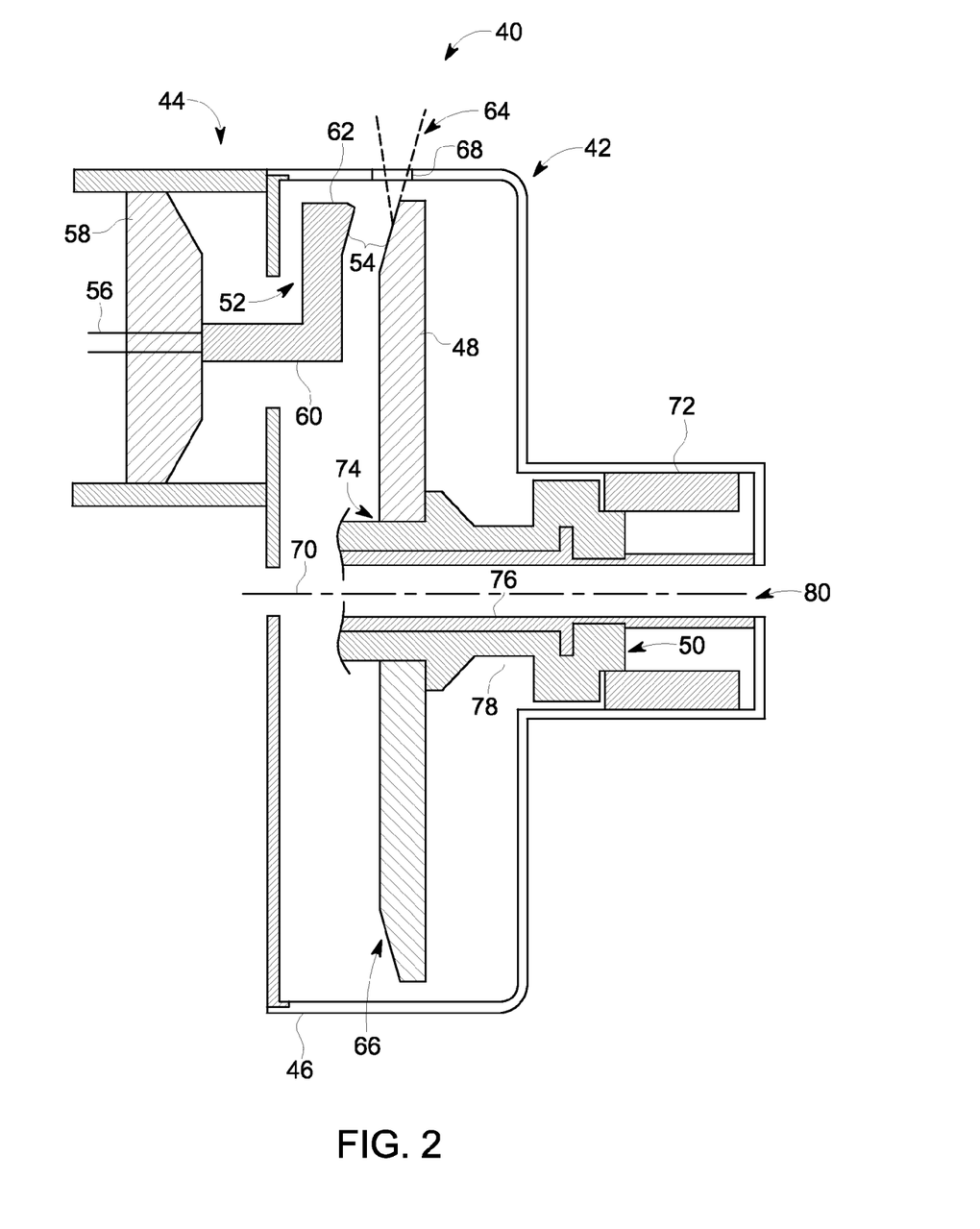
FIG. 2 a cross-sectional view of a portion of an x-ray tube according to an embodiment of the invention and useable with the system illustrated in FIG. 1.

FIG. 2 illustrates a cross-sectional view of an x-ray tube or x-ray source 40 incorporating embodiments of the invention. In the illustrated embodiment, x-ray source 40 includes an anode assembly 42 and a cathode assembly 44. X-ray tube 40 is supported by the anode and cathode assemblies 42, 44 within an envelope or frame 46, which houses a target or anode 48, a bearing assembly 50, and a cathode 52. Frame 46 defines an area of relatively low pressure (e.g., a vacuum) compared to ambient, in which high voltages may be present. Frame 46 may be positioned within a casing (not shown) filled with a cooling medium, such as oil, that may also provide high voltage insulation. While the target and anode are described above as being a common component of x-ray tube 40, the target and anode may be separate components in alternative x-ray tube embodiments.

In operation, an electron beam 54 is produced by cathode assembly 44. In particular, cathode 52 receives one or more electrical signals via a series of electrical leads 56. The electrical signals may be timing/control signals that cause cathode 52 to emit electron beam 54 at one or more energies and at one or more frequencies. The electrical signals may also at least partially control the potential between cathode 52 and anode 48. Cathode 52 includes a central insulating shell 58 from which a mask 60 extends. Mask 60 encloses electrical leads 56, which extend to a cathode cup 62 mounted at the end of mask 60. In some embodiments, cathode cup 62 serves as an electrostatic lens that focuses electrons emitted from a thermionic filament within cathode cup 62 to form electron beam 54.

X-rays 64 are produced when high-speed electrons of electron beam 54 are suddenly decelerated when directed from the cathode 52 to a target or focal surface 66 formed on target 48 via a potential difference therebetween of, for example, 60 thousand volts or more in the case of CT applications. The x-rays 64 are emitted through a radiation emission passage 68 formed in frame 46 toward a detector array, such as detector 18 of FIG. 1.

Anode assembly 42 includes a rotor 72 and a stator (not shown) located outside x-ray source 40 and partially surrounding rotor 72 for causing rotation of anode 48 during operation. Target 48 is supported in rotation by a bearing assembly 50, which, when rotated, also causes target 48 to rotate about the centerline 70. As shown, target 48 has a generally annular shape, such as a disk, and an annular opening 74 in the center thereof for receiving bearing assembly 50.

Target 48 may be manufactured to include a number of metals or composites, such as tungsten, molybdenum, copper, or any material that contributes to Bermsstrahlung (i.e., deceleration radiation) when bombarded with electrodes. Target or focal surface 66 of target 48 may be selected to have a relatively high refractory value so as to withstand the heat generated by electrons impacting target 48. Further, the space between cathode assembly 44 and target 48 may be evacuated in order to minimize electron collisions with other atoms and to maximize an electric potential.

To avoid overheating of the target 48 when bombarded by the electrons, rotor 72 rotates target 48 at a high rate of speed (e.g., 90 to 250 Hz) about a centerline 70. In addition to the rotation of target 48 within x-ray tube volume 46, in a CT application, the x-ray source 40 as a whole is caused to rotate about an object, such as object 16 of imaging system 10 in FIG. 1, at rates of typically 1 Hz or faster.

Bearing assembly 50 comprises a liquid lubricated or self-acting bearing having adequate load-bearing capability and acceptable acoustic noise levels for operation within imaging system 10 of FIG. 1. As used herein, the terms "self-acting" and "self-lubricating" mean that the bearing lubricant remains distributed on the surfaces of the bearing due to the relative motion of the bearing components and absent an external pump.

In general, bearing assembly 50 includes a stationary portion, such as center shaft 76, and a rotating portion, such as sleeve 78 to which the target 48 is attached. While center shaft 76 is described with respect to FIG. 2 as the stationary portion of bearing assembly 50 and sleeve 78 is described as the rotating portion of bearing assembly 50, embodiments of the present invention are also applicable to embodiments wherein center shaft 76 is a rotary shaft and sleeve 78 is a stationary component. In such a configuration, target 48 would rotate as center shaft 76 rotates.

Center shaft 76 may optionally include a cavity or coolant flow path 80 though which a coolant 82 (FIG. 3), such as oil, may flow to cool bearing assembly 50. As such, coolant 82 enables heat generated from target 48 of x-ray source 40 (FIG. 2) to be extracted therefrom and transferred external to x-ray source 40. In straddle mounted x-ray tube configurations, coolant flow path 80 extends along a longitudinal length of x-ray source 40. In alternative embodiments, coolant flow path 80 may extend through only a portion of x-ray source 40, such as in configurations where x-ray source 40 is cantilevered when placed in an imaging system.

Figure 3:
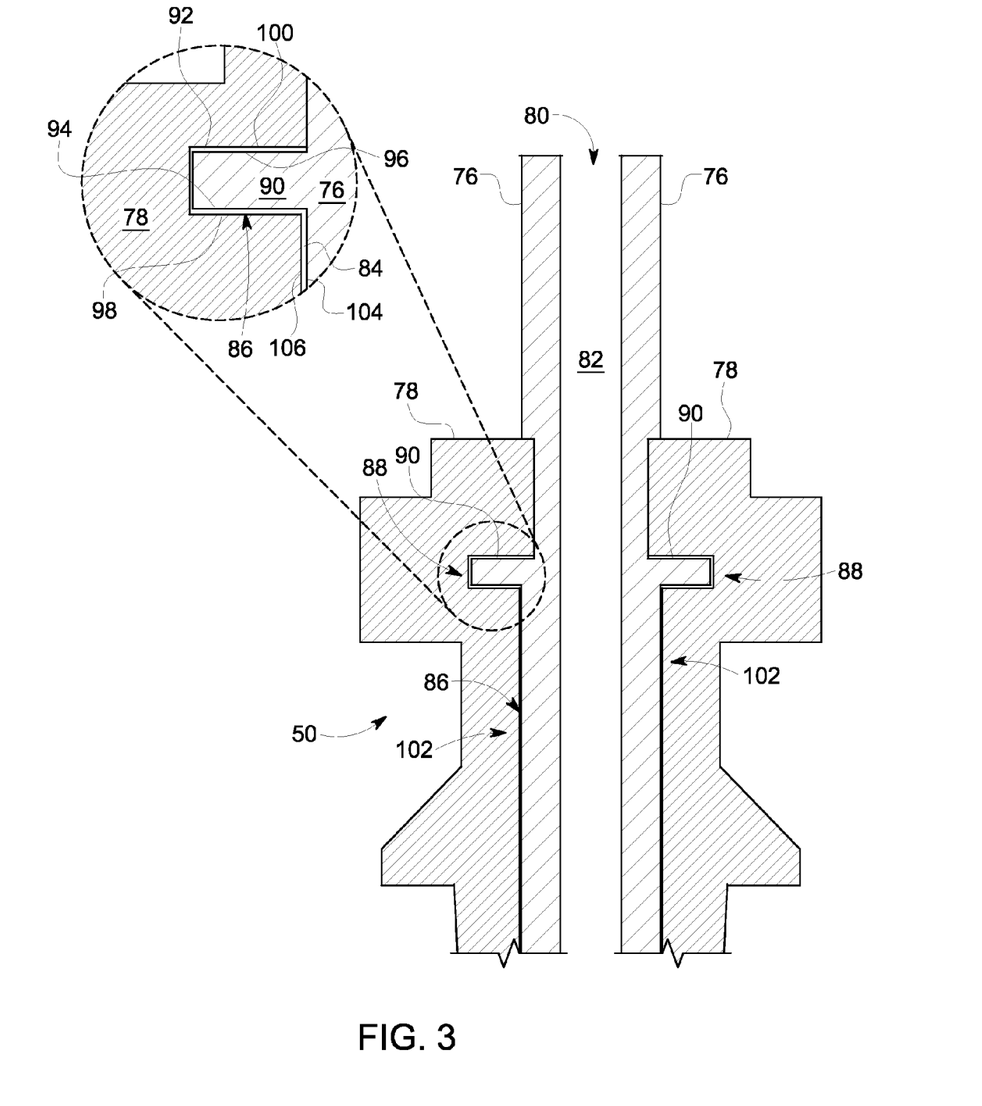
FIG. 3 is a cross-sectional view of a liquid lubricated bearing according to an embodiment of the invention.

Referring now to FIG. 3, a cross-sectional view of a portion of bearing assembly 50 is shown according to an embodiment of the invention. Bearing assembly 50 includes a center shaft 76 positioned within sleeve 78, which is configured to support an anode (not shown), such as target 48 of FIG. 2. A lubricant 84 is positioned in a gap 86 formed between center shaft 76 and sleeve 78. In embodiments of the invention, lubricant 84 is a metal or metallic alloy that exists in a liquid state at operating temperature of bearing assembly 50. Lubricant 84 may be gallium or a gallium alloy as non-limiting examples.

Exemplary base materials of center shaft 76 and sleeve 78 of bearing assembly 50 include ceramics, metals, and combinations thereof. In one embodiment, center shaft 76 and sleeve 78 are constructed of the same base material. Alternatively, the base materials of center shaft 76 and sleeve 78 may differ.

In the embodiment illustrated in FIG. 3, center shaft 76 of bearing assembly 50 is a stationary component and sleeve 78 is a rotatable component constructed to rotate about center shaft 76. However, one skilled in the art will recognize the inventive concepts described herein are applicable to alternative bearing configurations. As one example, bearing assembly 50 may instead include a stationary outer component and a rotating center shaft having a target attached thereto. As another example, bearing assembly 50 may be a "straddle" bearing that is configured to support a target between a first and a second liquid metal bearing. In other words, embodiments of this invention may be incorporated into any bearing configuration utilizing a liquid lubricated bearing to support an anode or target. Such configurations may include a stationary center shaft and a rotatable outer shaft, and vice versa. Further, one skilled in the art will recognize that such applications need not be limited to x-ray tubes, but may be applied to any configuration having a rotating component in a vacuum, the rotating component being supported by a liquid lubricated bearing. Thus, this invention is applicable to any bearing configuration having a rotatable component and a stationary component, and a liquid lubricant therebetween, regardless of configuration or application.

As illustrated in FIG. 3, center shaft 76 of bearing assembly 50 includes a thrust bearing portion 88 comprising a radial projection 90 that extends from center shaft 76 and is positioned in a radial cavity 92 of sleeve 78. Radial projection 90 of thrust bearing portion 88 includes a pair of outer race surfaces 94, 96 that face inner race surfaces 98, 100 of sleeve 78. In cantilever mount embodiments, sleeve 78 may also include a removable endcap (not shown) to allow assembly of components. Radial projection 90 limits axial motion of sleeve 78 relative to center shaft 76, and, as illustrated, lubricant 84 is also included between radial projection 90 and sleeve 78. Radial projection 90 need not be limited in axial length, but may be extended in axial length to provide additional mechanical support of components.

A radial or journal bearing portion 102 of bearing assembly 50 is located adjacent thrust bearing portion 88. An outer surface 104 of journal bearing portion 102 of center shaft 76 faces an inner surface 106 of journal bearing portion 102 of sleeve 78. While journal bearing portion 102 is illustrated on a first side of thrust bearing portion 88 adjacent outer race surface 94, one skilled in the art will recognize that bearing assembly 50 may include a second journal bearing portion located on a second side of thrust bearing portion 88 adjacent outer race surface 96.

As described in detail with respect to FIGS. 4-8, a combination of an anti-wetting coating 108 and patterns of grooves 110, 112, 114, 116 are formed on select surfaces of thrust bearing portion 88 and/or journal bearing portion 102 of bearing assembly 50 to prevent corrosion and/or wear of the base material of bearing assembly 50, reduce friction between bearing components, and facilitate flow of lubricant 84 in gap 86. The material properties of lubricant 84, coating 108, and grooves 110, 112, 114, 116 interact to force lubricant 84 to remain between center shaft 76 and sleeve 78 during rotation of bearing assembly 50. As a result, lubricant 84 remains distributed about center shaft 76 during rotation of sleeve 78, thus improving its lubricating effects and increasing the load capacity of bearing assembly 50. However, one skilled in the art will recognize that anti-wetting coating 108 may be any material or surface that exhibits the above-described anti-wetting characteristics with respect to the bearing lubricant.

As used herein, the term "anti-wetting" refers to a hydrophobic-like material property of coating 108 that causes the surfaces of coating 108 to be non-wetted when in contact with lubricant 84. In particular, a surface is anti-wetting when the lubricant contact angle with the surface is equal to or greater than 90 degrees. Thus, a slip boundary is formed between anti-wetting coating 108 and lubricant 84. According to various embodiments, anti-wetting coating 108 may be, for example, Titanium Nitride, Titanium Oxide, or Titanium Oxynitride, a carbon coating such as graphite or diamond, or an oxide of the base material of bearing assembly 50. Anti-wetting coating 108 may also be a ceramic coating including carbides, oxides, nitrides, borides, silicides, and composites which may include a non-ceramic reinforcement. Alternatively, anti-wetting coating 108 may be a refractory metal coating such as niobium, molybdenum, tantalum, tungsten, rhenium, titanium, vanadium, chromium, zirconium, hafnium, ruthenium, osmium, iridium and their alloys including stainless steel whose surface is primarily chromium.

Figure 4:
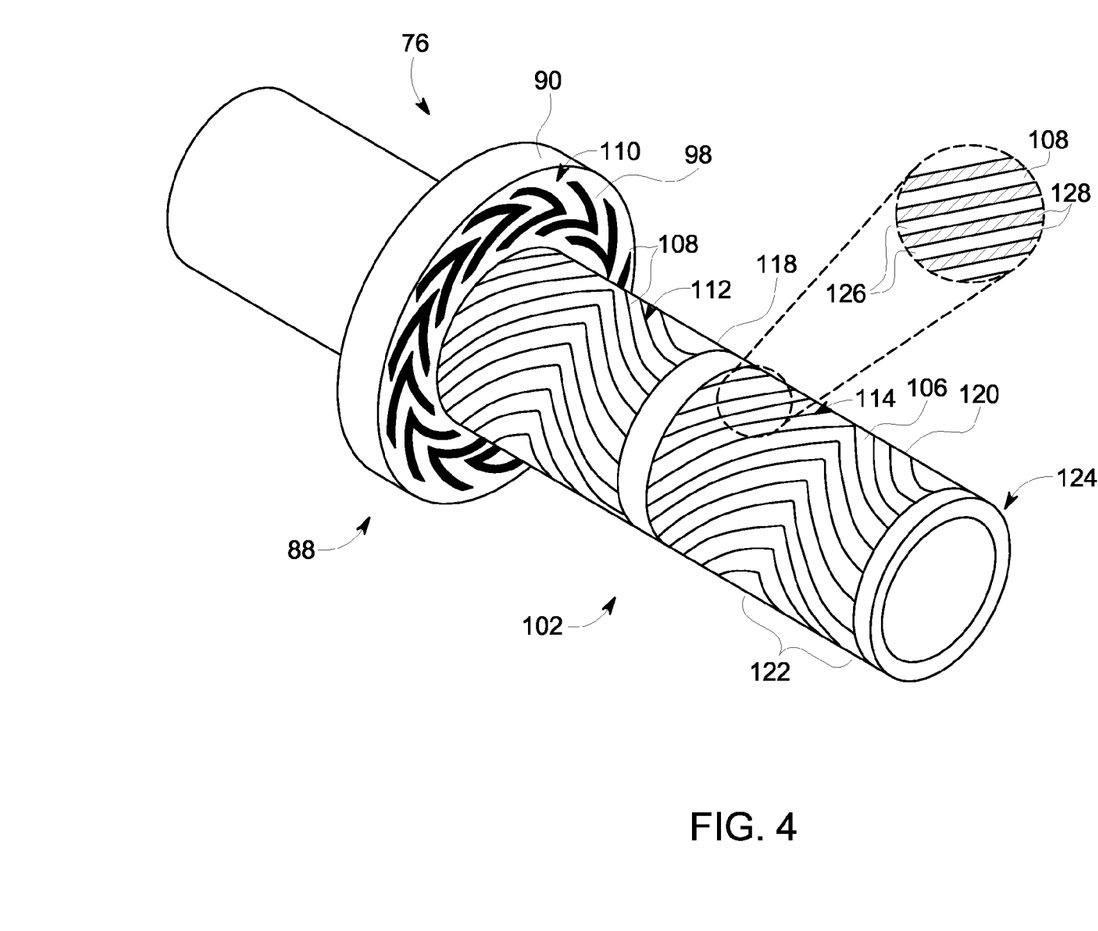
FIG. 4 is a perspective view of the bearing shaft of the liquid lubricated bearing of FIG. 3 according to an embodiment of the invention.

Referring now to FIG. 4, a perspective view of center shaft 76 of bearing assembly 50 is illustrated according to an embodiment of the invention. As described below, various patterns of grooves 110, 112, 114 are formed on inner surface 106 of journal bearing portion 102 as well as inner race surfaces 98, 100 of thrust bearing portion 88 to facilitate lubrication of bearing assembly 50. In one embodiment, a first pattern of grooves 110 is formed on inner race surface 98 of thrust bearing portion 88. A groove pattern may be formed in a similar manner on inner race surface 100 (FIG. 3). A second groove pattern 112 is formed in a first half bearing 118 of journal bearing portion 102 and a third groove pattern 114 is formed in a second half bearing 120 of journal bearing portion 102.

While groove patterns 110, 112, 114 are illustrated in a herringbone geometry, one skilled in the art will recognize that groove patterns 110, 112, 114 may have alternate geometries such as, for example, helical spirals, straight and curved lines, dots, cross-hatching, and the like. Further, the location of the various groove patterns may differ based on design specifications and be non-symmetrical along the axial length of bearing assembly 50. As one example, third groove pattern 114 may be limited to a portion 122 of second half bearing 120 adjacent end 124 of center shaft 76.

Anti-wetting coating 108 is formed on the bearing or land surfaces 126 of thrust bearing portion 88 and journal bearing portion 102 between adjacent grooves of groove patterns 110, 112, 114. Anti-wetting coating 108 may cover all of the bearing surfaces of journal bearing portion 102 and/or thrust bearing portion 88 or only a portion thereof, according to various embodiments. In one embodiment, anti-wetting coating 108 is initially applied on inner surface 106 of journal bearing portion 102 and/or as inner race surfaces 98, 100 of thrust bearing portion 88 before groove patterns 110, 112, 114 are formed thereon. Groove patterns 110, 112, 114 are then formed by removing select portions of anti-wetting coating 108 corresponding to non-bearing or non-land surfaces 128 of thrust bearing portion 88 and journal bearing portion 102. Groove patterns 110, 112, 114 have a thickness at least equal to the thickness of anti-wetting coating 108, such that non-bearing surfaces 128 are substantially free of anti-wetting coating 108 and exhibit a wetting surface property with respect to lubricant 84. As used herein, a "wetting" surface property means that a lubricant contact angle with the surface is less than 90 degrees.

In an alternative embodiment, anti-wetting coating 108 is patterned on land surfaces 126 such that portions of non-bearing surfaces 128 corresponding to groove patterns 110, 112, 114 remain substantially free of anti-wetting coating 108. In such an embodiment, groove patterns 110, 112, 114 may be formed via selective application of the anti-wetting coating 108 without an additional machining step to remove excess anti-wetting coating 108.

Anti-wetting coating 108 is applied or formed, according to embodiments of the invention, by molten salt deposition, electroplating, chemical vapor deposition (CVD), PVD, plasma-enhanced PVD (PE-PVD), a laser-enhanced process (such as laser-enhanced net shaping known as LENS®, LENS® is a registered trademark of Sandia Corporation, Albuquerque, N. Mex.), cold spray, surface hardening techniques such as carburization, and combinations thereof. Anti-wetting coating 108 may be applied in thicknesses selected according to process conditions and desired outcomes.

In embodiments of the invention, anti-wetting coating 108 enables a post-machining or post-processing step to be performed thereon prior to final assembly of bearing assembly 50. The post-processing step may be used with any number of material removal techniques commonly known in the art, such as machining, acid-etch, laser etching, electrochemical machining, and the like. In such embodiments, anti-wetting coating 108 is first applied having a thickness greater than, for instance, 0.1 micrometers, to facilitate and enable post-coating machining such that groove production (e.g., due to the machining process) occurs in the coating layer and not in the base metal. In other words, the coating or material is typically thick enough to enable cutting grooves in anti-wetting coating 108 and not in the base metal of center shaft 76. In addition, in embodiments that include applying anti-wetting coating 108 and then performing a post-machining step, one skilled in the art will recognize that initial tolerances of the base material may be relaxed, and that the post-machining step may include higher tolerance fine machining, thus decreasing the cost of processing by allowing for a lower tolerance part to be fabricated prior to application of anti-wetting coating 108. It is to be recognized that the processes described are but examples for application of coatings according to the invention, and that any number of coating processes may be employed for application of a coating according to the invention.

Because of the thicknesses capable from these processes, the processes likewise support a post-machining process according to the invention by enabling grooves to be cut from the applied material during post-machining. Cold spray, for instance, may be used to apply anti-wetting coating 108 by propelling fine powder particles at high velocities using a compressed gas. The particles are relatively cold, so bulk reaction on impact is in solid state, and there is little to no oxidation. Because the particles typically do not melt during the process, there is relatively little shrinkage upon cooling of the base material. Molten salt deposition may be used to apply anti-wetting coating 108 to sufficient thicknesses as well. The process typically includes electrolytic deposition of a refractory metal such as molybdenum in a molten salt mixture. The salt mixture, in embodiments of the invention and as understood in the art, may include NaCl, KCl, and the like. During deposition, as understood in the art, the parts are cathodically polarized and the molten salt typically includes a source of ions of the refractory metal.

The thicknesses of anti-wetting coating 108 may be selected based on a desired life of the coating, based on the kinetic rate of corrosion that occurs in, for instance, molybdenum in the presence of liquid gallium, while taking into account operating temperatures and other factors that impact the rate of corrosion. In one embodiment of the invention, the final thicknesses of coating 108 is greater than 0.1 micrometers to provide adequate life of bearing assembly bearing assembly 50 during the life of x-ray source 40.

Figure 5:
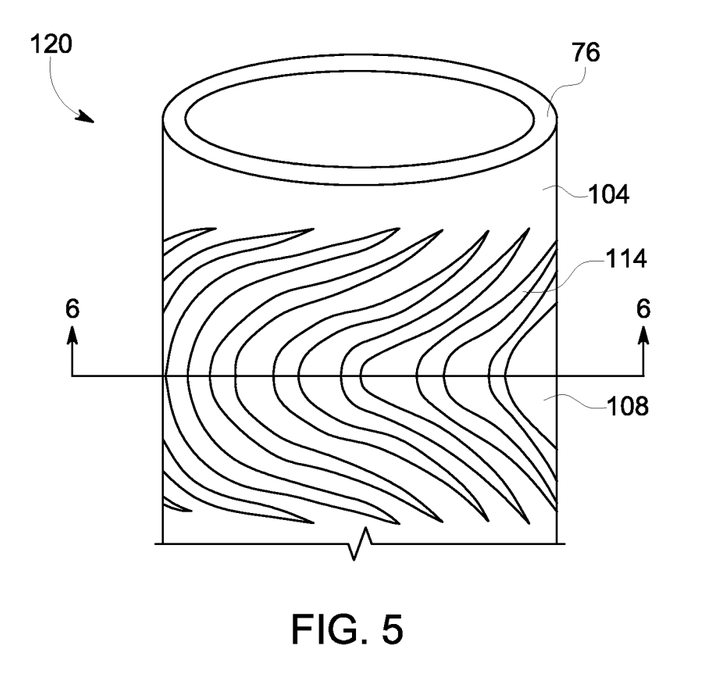
FIG. 5 is a perspective view of a portion of the bearing shaft of FIG. 3.
Figure 6:
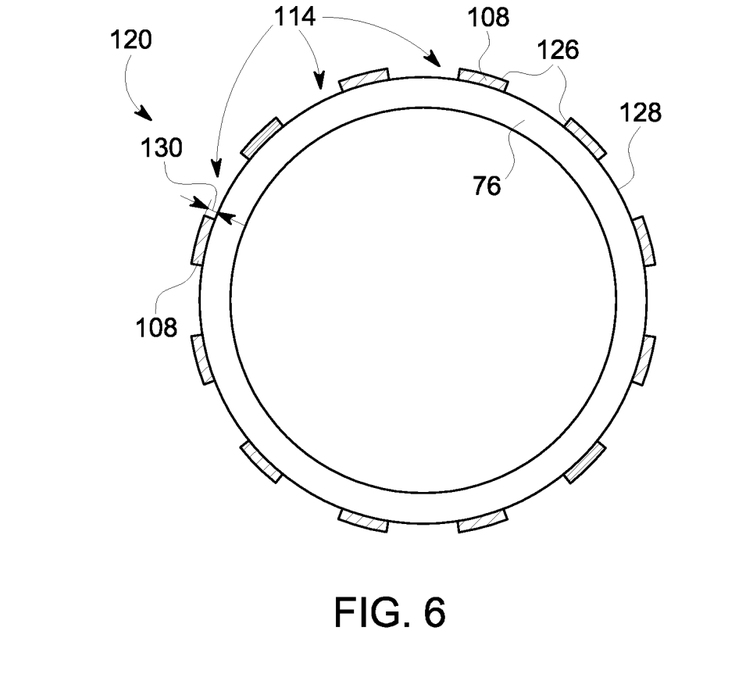
FIG. 6 is a cross-sectional view the portion of the bearing shaft of FIG. 5.

A perspective view of a portion of second half bearing 120 is shown in perspective in FIG. 5 and in cross section in FIG. 6 to illustrate exemplary groove pattern 114 and anti-wetting coating 108 in additional detail. As shown, anti-wetting coating 108 exists on bearing or land surfaces 126 of outer surface 104 of center shaft 76 between adjacent grooves of groove pattern 114. Groove pattern 114 extends through a thickness 130 of anti-wetting coating 108 thereby exposing a non-coated portion of outer surface 104 of center shaft 76 corresponding to a non-bearing or non-land surface 128. The alternating configuration of anti-wetting bearing surfaces 126 and wetting non-bearing surfaces 128 on common surface of outer surface 104 of center shaft 76 facilitates containment of lubricant 84 (FIG. 3) within bearing assembly 50 and improves load capability as compared to a traditional "half-wetted" bearings, where one bearing component has a wetted surface and the other bearing component has a non-wetted surface.

Figure 7:
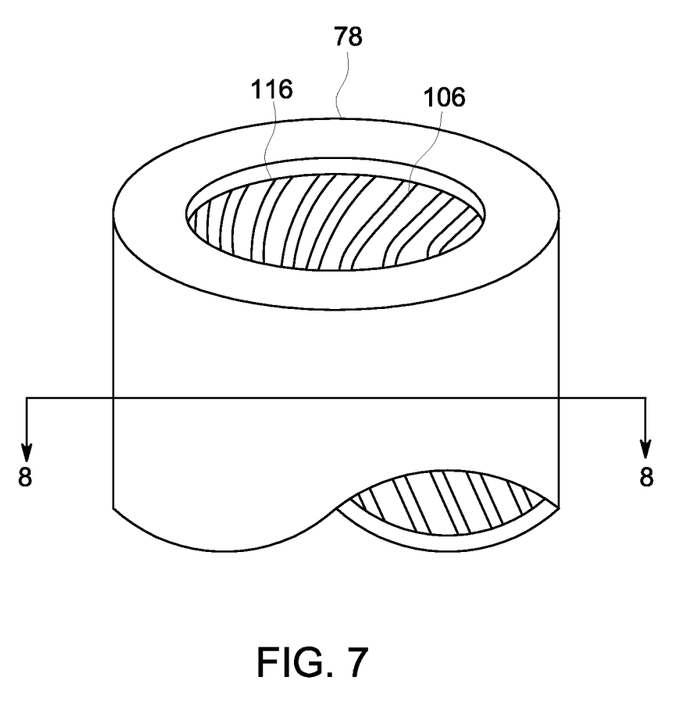
FIG. 7 is a perspective view of a portion of the bearing sleeve of the liquid lubricated bearing of FIG. 3 according to an embodiment of the invention.
Figure 8:
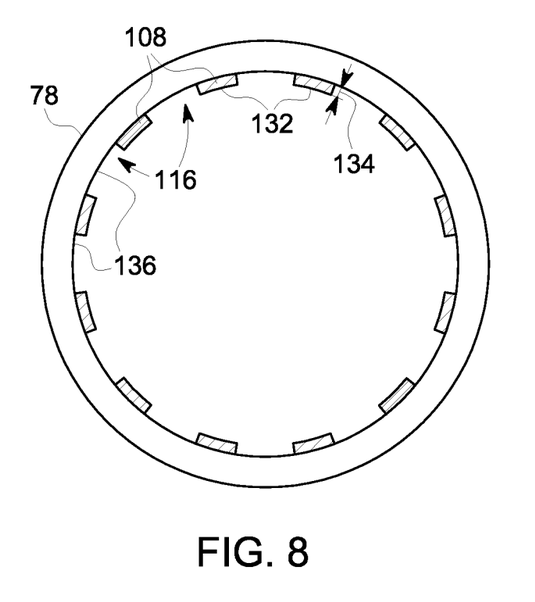
FIG. 8 is a cross-sectional view the portion of the bearing sleeve of FIG. 7.

While FIGS. 4-6 describe anti-wetting coating 108 and groove patterns 110, 112, 114 being formed on center shaft 76 of bearing assembly 50, groove patterns may be formed in an anti-wetting coating formed on the inner surface 106 of sleeve 78 of bearing assembly 50 in a similar manner. Referring now to FIGS. 7 and 8, a portion of sleeve 78 is shown in perspective in FIG. 7 and in cross section in FIG. 8. As shown, groove pattern 116 and anti-wetting coating 108 are formed on inner surface 106 of sleeve 78 in a similar manner as described with respect to FIGS. 5 and 6. Anti-wetting coating 108 exists on bearing surfaces 132 of inner surface 106 and groove pattern 116 extends through a thickness 134 of anti-wetting coating 108 to expose uncoated non-bearing surfaces 136 of sleeve 78. Thus, an alternating pattern of coated, anti-wetting bearing surfaces 132 and uncoated, wetting non-bearing surfaces 136 is formed on a common surface of inner surface 106 of sleeve 78.

In addition, anti-wetting coating 108 may be formed on both the inner surface 106 of sleeve 78 and the outer surface 104 of center shaft 76. In such an embodiment, groove patterns may be formed in anti-wetting coating 108 at select locations of both inner and outer surfaces 104, 106. In one exemplary embodiment, a herringbone groove pattern may be formed in anti-wetting coating 108 of outer surface 104 of center shaft 76 and a polka dot groove pattern may be formed in anti-wetting coating 108 of surface 106 of sleeve 78. As one skilled in the art will recognize, the location and geometry of the groove patterns on inner and outer surfaces 104, 106 may be selected in any number of combinations so as to achieve desired flow characteristics, friction reduction, and containment of lubricant 84 within bearing assembly 50.

Figure 9:
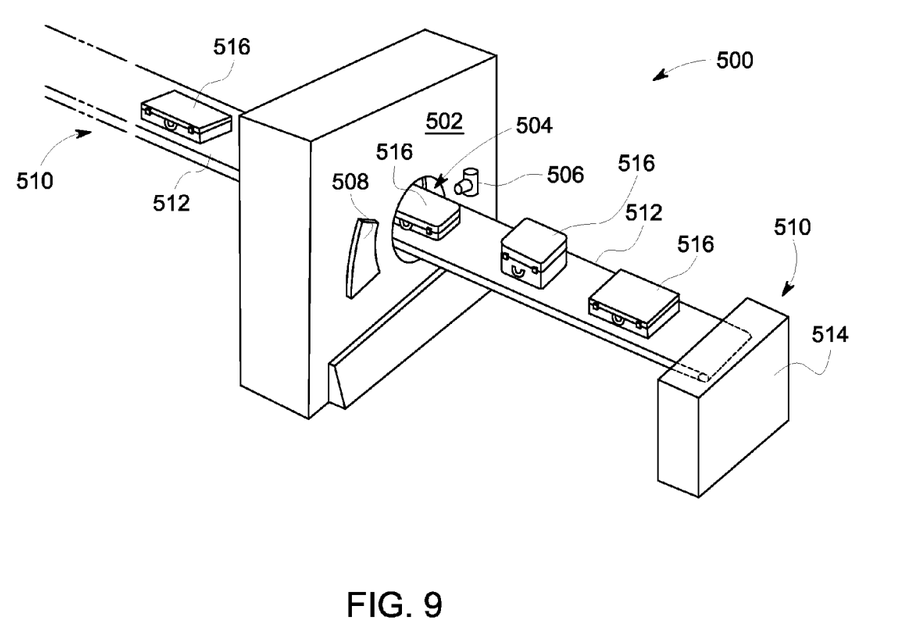
FIG. 9 is a pictorial view of an x-ray system for use with a non-invasive package inspection system.

Referring now to FIG. 9, there is shown a package/baggage inspection system 500 that can use the x-ray tube or tubes of the invention and which includes a rotatable gantry 502 having an opening 504 therein through which packages or pieces of baggage may pass. The rotatable gantry 502 houses one or more x-ray energy sources 506 as well as a detector assembly 508 having scintillator arrays comprised of scintillator cells. A conveyor system 510 is also provided and includes a conveyor belt 512 supported by structure 514 to automatically and continuously pass packages or baggage pieces 516 through opening 504 to be scanned. Objects 516 are fed through opening 504 by conveyor belt 512, imaging data is then acquired, and the conveyor belt 512 removes the packages 516 from opening 504 in a controlled and continuous manner. As a result, postal inspectors, baggage handlers, and other security personnel may non-invasively inspect the contents of packages 516 for explosives, knives, guns, contraband, etc.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

According to an embodiment of the invention, a bearing includes a sleeve having an opening formed therein and a shaft positioned within the opening of the sleeve such that a gap is formed between an inner surface of the sleeve and an outer surface of the shaft. A lubricant is disposed in the gap and a plurality of grooves are formed on at least one of the outer surface of the shaft and the inner surface of the sleeve. An anti-wetting coating is disposed on the at least one of the outer surface of the shaft and the inner surface of the sleeve between adjacent grooves of the plurality of grooves.

According to another embodiment of the invention, a method of manufacturing a bearing includes the steps of providing a bearing assembly that includes a shaft and a sleeve having an inner diameter greater than an outer diameter of the shaft, wherein a gap is formed between an inner surface of the bearing sleeve and an outer surface of the shaft. The method also includes forming an anti-wetting coating on at least one of the outer surface of the shaft and the inner surface of the sleeve and forming a plurality of grooves on at least one of the outer surface of the shaft and the inner surface of the sleeve, wherein the plurality of grooves are absent the anti-wetting coating, and wherein the plurality of grooves and the anti-wetting coating are formed on a common surface of the bearing assembly. The method further includes disposing a lubricant in the gap.

According to another yet another embodiment of the invention, an x-ray tube includes a cathode and a target assembly positioned to receive electrons emitted from the cathode. The target assembly includes a target and a self-lubricating bearing configured to support the target. The self-lubricating bearing includes a rotatable component having a first surface, a stationary component positioned with respect to the rotatable component such that a gap is formed between a first surface of the rotatable component and a first surface of the stationary component, and a liquid lubricant disposed within the gap. A bearing surface of the self-lubricating bearing comprises an anti-wetting surface and a non-bearing surface of the self-lubricating bearing comprises a wetting surface. The anti-wetting surface and the wetting surface are alternately located on a common surface of the self-lubricating bearing.

According to another yet another embodiment of the invention, a bearing includes at least one friction-reducing surface comprising a plurality of alternating anti-wetting and wetting portions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bearing comprising:
   a sleeve having an opening formed therein;
   a shaft positioned within the opening of the sleeve such that a gap is formed between an inner surface of the sleeve and an outer surface of the shaft;
   a lubricant disposed in the gap;
   a plurality of grooves formed on at least one of the outer surface of the shaft and the inner surface of the sleeve; and
   an anti-wetting coating disposed on the at least one of the outer surface of the shaft and the inner surface of the sleeve between adjacent grooves of the plurality of grooves.

2. The bearing of claim 1 wherein the plurality of grooves comprise at least one of a herringbone geometry and a spiral geometry.

3. The bearing of claim 1 wherein the plurality of grooves are non-symmetrical across an axial length of the self-acting bearing.

4. The bearing of claim 1 wherein the plurality of grooves are formed on at least one of a thrust bearing surface and a radial bearing surface of the self-acting bearing.

5. The bearing of claim 1 wherein the anti-wetting coating comprises a refractory metal.

6. The bearing of claim 1 wherein the anti-wetting coating comprises a ceramic.

7. The bearing of claim 1 wherein the anti-wetting coating comprises one of Titanium Nitride, Titanium Oxide, and Titanium Oxynitride.

8. The bearing of claim 1 wherein the lubricant comprises Gallium.

9. The bearing of claim 1 wherein the lubricant comprises a liquid metal.

10. The bearing of claim 1 wherein the anti-wetting coating is applied to bearing surfaces of at least one of the outer surface of the shaft and the inner surface of the sleeve; and
   wherein the plurality of grooves comprise non-bearing surfaces of the at least one of the outer surface of the shaft and the inner surface of the sleeve.

11. The bearing of claim 1 wherein the plurality of grooves are wetting.

12. The bearing of claim 1 wherein a depth of the plurality of grooves is approximately equal to a thickness of the anti-wetting coating.

13. The bearing of claim 1 wherein the plurality of grooves are formed in a non-circumferential pattern.

14. A method of manufacturing a bearing comprising the steps of:
   providing a bearing assembly, the bearing assembly comprising:
   a shaft; and
   a sleeve having an inner diameter greater than an outer diameter of the shaft, wherein a gap is formed between an inner surface of the bearing sleeve and an outer surface of the shaft;
   forming an anti-wetting coating on at least one of the outer surface of the shaft and the inner surface of the sleeve;
   forming a plurality of grooves on at least one of the outer surface of the shaft and the inner surface of the sleeve, wherein the plurality of grooves are absent the anti-wetting coating, and wherein the plurality of grooves and the anti-wetting coating are formed on a common surface of the bearing assembly; and
   disposing a lubricant in the gap.

15. The method of claim 14 further comprising forming the plurality of grooves in at least one of a herringbone pattern and a spiral pattern.

16. The method of claim 14 further comprising patterning the anti-wetting coating on the common surface of the bearing assembly to define a plurality of anti-wetting portions and a plurality of wetting portions on the common surface.

17. The method of claim 14 wherein forming the anti-wetting coating comprises coating the at least one of the outer surface of the shaft and the inner surface of the sleeve with a material that exhibits anti-wetting properties when exposed to the lubricant.

18. The method of claim 14 further comprising forming the plurality of grooves in a non-circumferential pattern.

19. An x-ray tube comprising:
   a cathode; and
   a target assembly positioned to receive electrons emitted from the cathode, the target assembly comprising:
   a target; and
   a self-lubricating bearing configured to support the target, the self-lubricating bearing comprising:
   a rotatable component having a first surface;
   a stationary component positioned with respect to the rotatable component such that a gap is formed between a first surface of the rotatable component and a first surface of the stationary component; and
   a liquid lubricant disposed within the gap; and
   wherein a bearing surface of the self-lubricating bearing comprises an anti-wetting surface; and
   wherein a non-bearing surface of the self-lubricating bearing comprises a wetting surface; and
   wherein the anti-wetting surface and the wetting surface are alternately located on a common surface of the self-lubricating bearing, the common surface comprising at least one of a thrust bearing surface and a radial bearing surface of the self-lubricating bearing.

20. The x-ray tube of claim 19 wherein the stationary component comprises a center shaft and the rotatable component comprises a sleeve, the sleeve having the target attached thereto.

21. The x-ray tube of claim 19 wherein the bearing surface comprises an anti-wetting coating formed on at least one of the first surface of the rotatable component and the first surface of the stationary component.

22. The x-ray tube of claim 21 wherein the anti-wetting coating comprises at least one of Titanium, a ceramic, a refractory metal, an oxide of a base metal of the self-lubricating bearing.

23. The x-ray tube of claim 19 wherein the non-bearing surface comprises a pattern of grooves formed on at least one of the first surface of the rotatable component and the first surface of the stationary component.

24. A bearing comprising:
    at least one friction-reducing surface comprising a plurality of alternating anti-wetting and wetting portions, wherein the wetting portions of the at least one friction-reducing surface have one of a helical spiral and a herringbone geometry.

25. The bearing of claim 24 further comprising a first friction-reducing surface a rotating component of the bearing; and
    a second friction-reducing surface on a stationary component of the bearing.

26. The bearing of claim 24 wherein the anti-wetting portions of the at least one friction-reducing surface comprise bearing surfaces; and
    wherein the wetting portions of the at least one friction-reducing surface comprise non-bearing surfaces.

27. The bearing of claim 24 wherein the wetting portions of the at least one friction-reducing surface comprise grooves formed in the at least one friction reducing surface.

28. The bearing of claim 24 wherein the anti-wetting portions of the at least one friction-reducing surface comprises at least one of Titanium, a ceramic, a refractory metal, and an oxide of a base metal of the bearing.

* * * * *